March 20, 1962     W. R. KING     3,025,759

PHOTOGRAPHIC SLIDE PROJECTOR

Original Filed June 29, 1960     4 Sheets-Sheet 1

INVENTOR.
WILLIAM R. KING
BY
ATTORNEY

March 20, 1962 W. R. KING 3,025,759
PHOTOGRAPHIC SLIDE PROJECTOR
Original Filed June 29, 1960 4 Sheets-Sheet 2

INVENTOR.
WILLIAM R. KING
BY
ATTORNEY

March 20, 1962 W. R. KING 3,025,759
PHOTOGRAPHIC SLIDE PROJECTOR
Original Filed June 29, 1960 4 Sheets-Sheet 3

INVENTOR.
WILLIAM R. KING
ATTORNEY

INVENTOR.
WILLIAM R. KING
BY
ATTORNEY

United States Patent Office 3,025,759
Patented Mar. 20, 1962

3,025,759
PHOTOGRAPHIC SLIDE PROJECTOR
William Roy King, Denver, Colo., assignor to Minneapolis-Honeywell Regulator Company, Minneapolis, Minn., a corporation of Delaware
Original application June 29, 1960, Ser. No. 39,531. Divided and this application Apr. 19, 1961, Ser. No. 112,146
2 Claims. (Cl. 88—28)

This invention is concerned with a photographic slide projector and particularly with a slide projector which utilizes a photographic slide storage tray holding a plurality of individual photographic slides and having means to facilitate changing of the slides synchronized with step movement of the slide storage tray.

The present invention provides an improved projector of this general type in which the slide storage tray is provided with a gear rack to facilitate movement of the tray, and the slide changing mechanism of the projector also controls a drive pawl to engage the gear rack and move the tray. Once a slide has been returned to the tray and the slide tray has been advanced, another slide is then moved to the projection compartment of the projector to be displayed on a screen or the like. To prevent possible jamming of the projector, as a slide is moved to the projection compartment, the present invention utilizes a slide tray lock. This lock is in the form of a pawl whose movement is controlled by the slide changing mechanism to cause a lock pawl to engage the face of one of the gear teeth and to subsequently enter the space between that one tooth and the succeeding tooth. In this manner, the lock pawl not only locks the tray, but also prevents inadvertent movement of the slide tray more than a single slide spacing.

This application is a division of application No. 39,531 of the applicant William Roy King, entitled Photographic Slide Projector, filed June 29, 1960, now U.S. Patent No. 2,998,750 issued Sept. 5, 1961.

Figure 1:
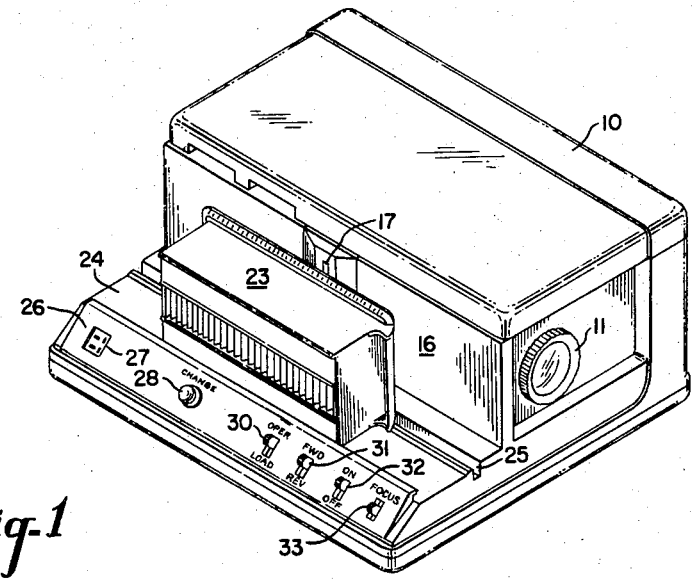
Figure 2:
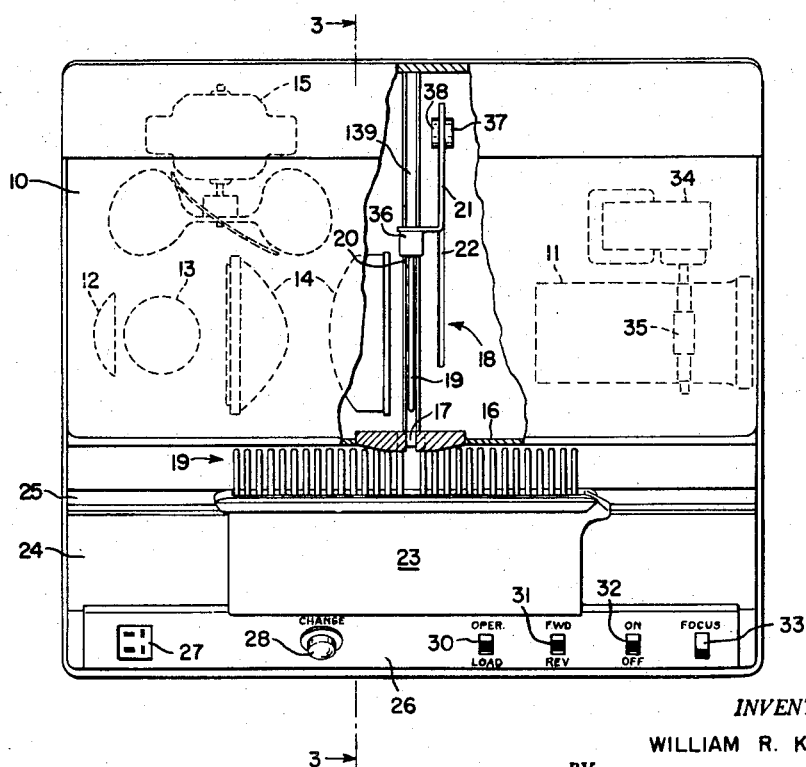
Figure 3:
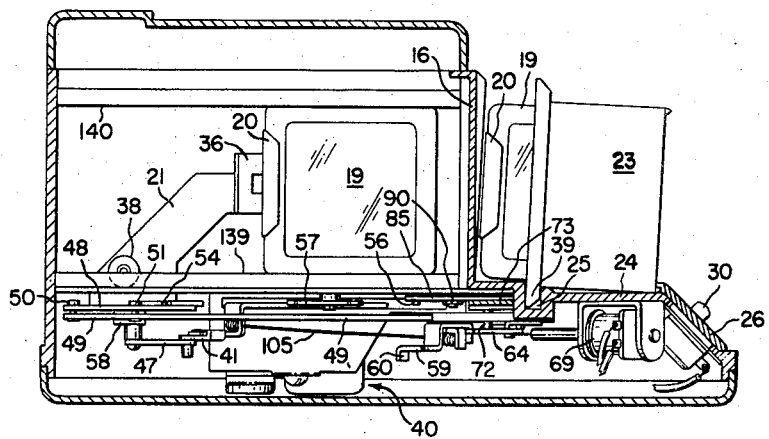
Figure 4:
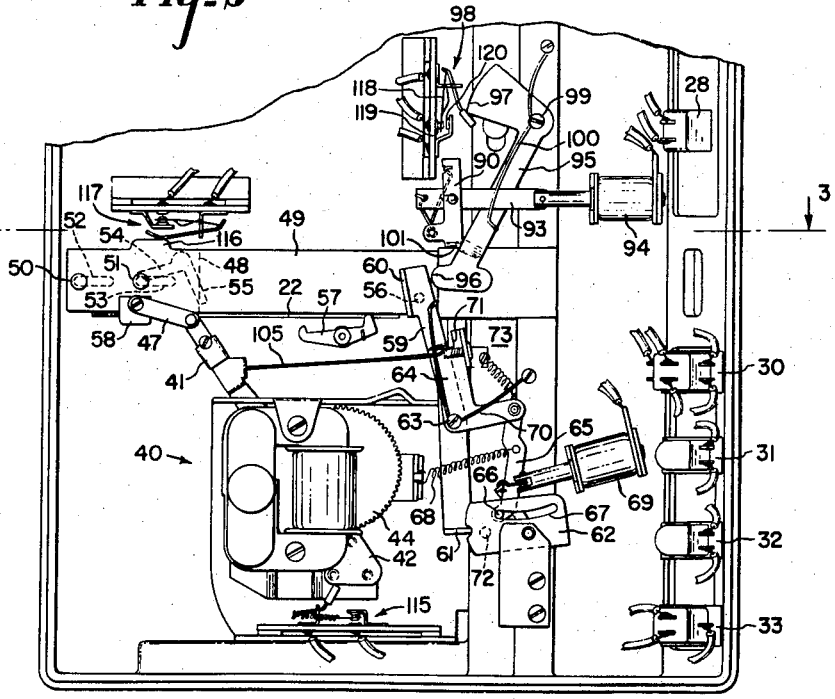
Figure 5:
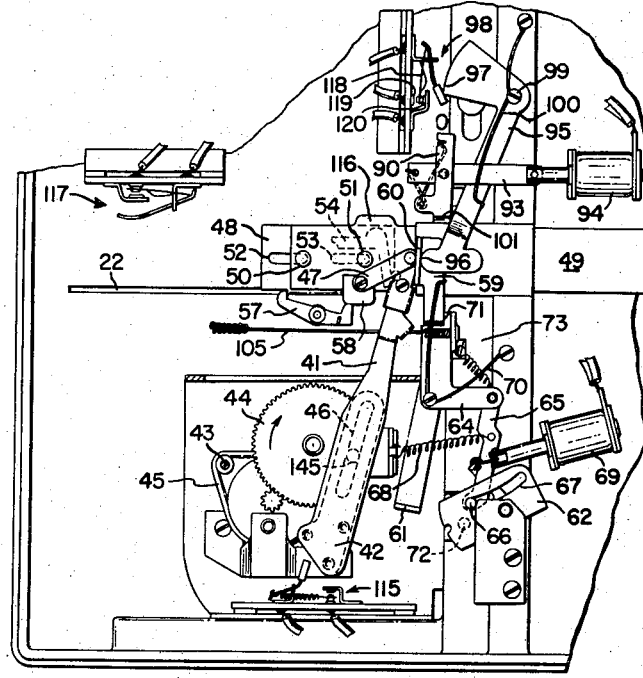
Figures 6, 7, 8:
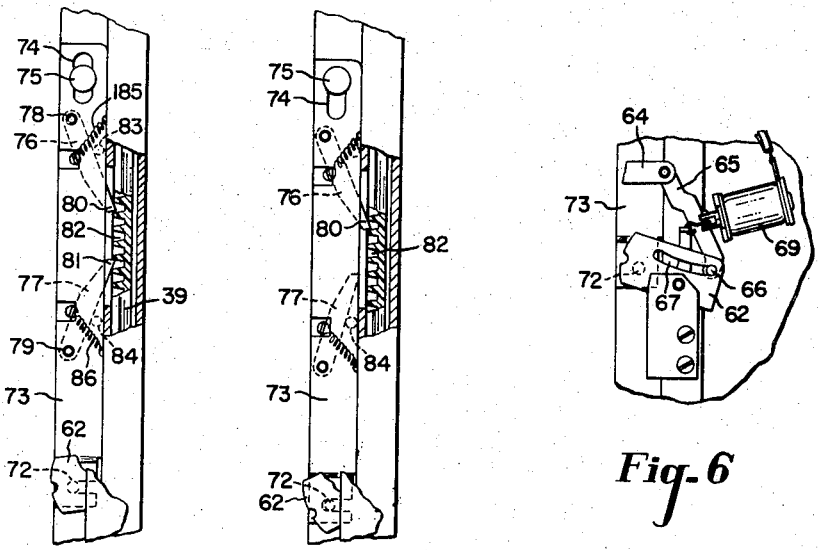
Figure 12:
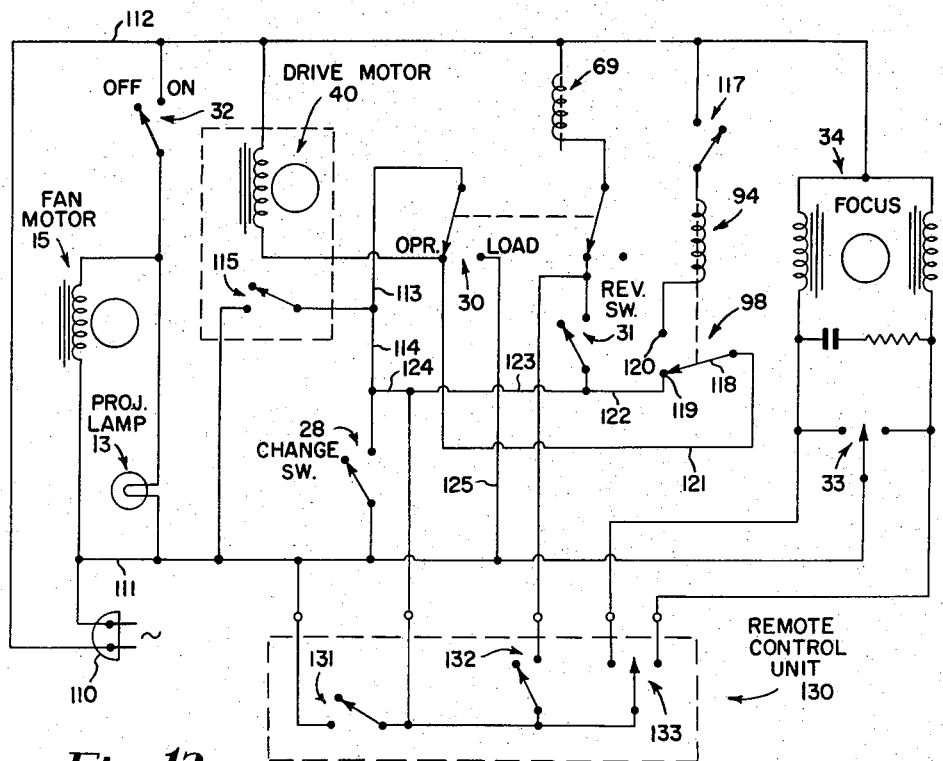
Figure 9:
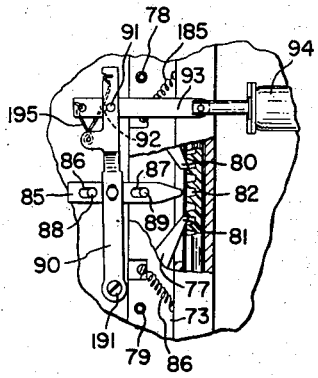
Figure 10:
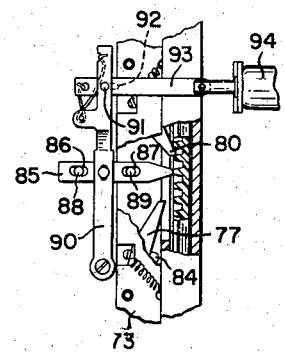
Figure 11:
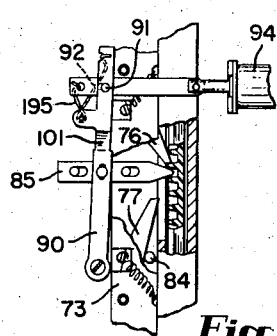

The inventive features of the present invention will be apparent to those skilled in the art upon reference to the following specification, claims, and drawings, of which:

FIGURE 1 is a perspective view of a projector embodying the present invention, showing the front face of the case of a photographic slide projector, wherein a slide storage tray is positioned on a slide tray receiving platform, and furthermore showing the control switches for the projector and the electrical outlet for a remote cord, FIGURE 2 is a top view of the projector of FIGURE 1, showing various internal components in broken lines and showing a portion of the upper wall of the housing broken away, with a photographic slide shown disposed in the projection compartment of the projector, FIGURE 3 is a section view of the projector of FIGURES 2 and 4 taken along the line 3—3, FIGURE 4 is a partial bottom view of the projector, FIGURE 5 is a view similar to FIGURE 4 showing the parts in a different phase of operation, FIGURE 6 is a view of the reversing solenoid, which is adapted to control the direction of movement of the slide storage tray, in a different phase of operation from that shown in FIGURE 4, FIGURE 7 is a view of the slide tray advancing mechanism, showing the driving pawls engaging the gear rack in the slide storage tray, this being the condition of the parts when a slide is positioned at the projection compartment, FIGURE 8 is a showing of the slide tray advancing mechanism of FIGURE 7 with one of the driving pawls moved out of engagement with the gear rack and the other driving pawl providing a force which has moved the slide storage tray a distance equal to the spacing of the individual slides within the tray, FIGURE 9 is a view of the slide tray locking mechanism in the unlocked condition, FIGURE 10 is a view of the slide tray locking mechanism showing the manner in which the slide tray locking pawl leads the slide tray during movement of the tray, FIGURE 11 is a further showing of the slide tray locking mechanism wherein the slide tray has moved a further distance from that shown in FIGURE 10, and the slide tray locking pawl has now moved into a locking position, and FIGURE 12 is a circuit diagram showing the electrical circuitry of the improved photographic slide projector.

Referring specifically to FIGURE 1, the reference numeral 10 designates the outer case or housing of a photographic slide projector. The forward face of this projector includes an objective lens 11 and the axis of this lens defines the optical axis of the projector. In FIGURE 2, this optical axis can be seen to include a reflector 12, a lamp 13, and a condensing lens system 14. Also shown in FIGURE 2 is a blower motor 15 which provides cooling air.

Referring again to FIGURE 1, the housing of the projector includes a side wall designated generally by means of reference numeral 16. This side wall includes a slide receiving window 17 which leads to a projection compartment which is aligned with the optical axis, designated generally by means of reference numeral 18, see FIGURE 2.

In FIGURE 2 a photographic slide or transparency 19 is held in the projection compartment in alignment with the optical axis of the projector and is therefore adapted to be projected on a screen or the like. The slide is held in this position by means of a permanent magnet 36 which is magnetically coupled to a magnetic clip 20 firmly held on the edge of slide 19. As will be apparent, magnet 37 and its supporting member 21 are portions of a slide changing mechanism and member 21 is movable through a slot 22 to return slide 36 to its compartment within a slide storage tray 23.

This slide storage tray 23 is mounted on a slide tray receiving platform 24, see FIGURE 1, and this platform is further provided with a channel 25 which receives an offset portion 29 (see FIGURE 3) of the slide storage tray 23, this offset portion having an elongated gear rack 82 (see FIGURE 7) to facilitate step movement of the slide storage tray.

Referring again to FIGURES 1 and 2, reference numeral 26 designates the control panel for the slide projector. Starting at the left-hand end of this control panel, the reference numeral 27 designates an electrical outlet which is adapted to be connected to a remote cord to facilitate remote control of the projector. The reference numeral 28 designates a momentary contact change switch which is effective to cause slide 19 to be returned to the slide tray 23, the tray to be moved a distance to bring the next succeeding slide into alignment with window 17, and this next succeeding slide to be moved to the projection compartment. It should be pointed out at this time that while not shown, each of the slides of FIGURE 2 positioned within the slide storage tray are provided with a clip 20 similar to that shown mounted on the edge of clip 19. Reference numeral 30 designates a switch having two positions, designated "oper" for operate, and load. Reference numeral 31 designates a similar switch having a first position designated "fwd" for forward and "rev" for reverse. Reference numeral 32 is a similar switch having an on position and an off position. Switch 33 is a momentary type double pole switch which controls the focusing of the projector.

The reference numeral 34 of FIGURE 2 identifies a reversible electric motor whose direction of rotation is controlled by switch 33. This electric motor drives a roller 35 which mates with the barrel of lens 11 and selectively moves this lens in either direction to focus the projector.

Referring now to FIGURE 3, this figure shows a section view of the projector taken along the line 3—3 of FIGURES 2 and 4. In FIGURE 3 the slide 19 can be shown positioned in aligned positions with the optical axis of the projector and held in slide guides 39 and 40. In this figure the slide tray receiving platform 24 and the channel 25 can be seen more clearly and the offset portion 39 of the slide storage tray can be seen more clearly.

While the various mechanical and electrical components of the slide changing mechanism and the slide tray advancing mechanism can be seen in FIGURE 3, they are more clearly disclosed in FIGURES 4 and 5. FIGURE 4 discloses an electric motor 40 which, through a gear drive arrangement, controls the position of an arm 41, the arm being pivoted at its lower end 42. In FIGURE 3 a portion of the motor has been broken away and the drive shaft 43 can be seen. This drive shaft is connected to control a main gear 44 to cause clockwise rotation through the medium of a belt drive 45. The gear 44 carries a pin 45 mating with an elongated slot 46 formed in arm 41. In this manner, one complete rotation of 360° of gear 44 causes arm 41 to move in a clockwise direction from its position of FIGURE 4 to its position of FIGURE 5 and then return by means of counter-clockwise rotation to its position of FIGURE 4.

The upper end of arm 41 is connected by means of a link 47 to a cam 58 which is mounted on a main control bar 49. As can be seen in FIGURE 3, bar 49 carries a plate 48 which in turn mounts member 21. Plate 48 is mounted directly above control bar 49 by means of two pins 50 and 51 formed in bar 49. These pins mate with elongated slots 52 and 53 formed in plate 48. With the apparatus as shown in FIGURE 4, that is with the slide positioned at the projection compartment 18, plate 48 and rod 49 are locked together by means of a spring biased lever 54, also shown in FIGURE 3. This lever is biased in counter-clockwise direction and is pivotally mounted on the top of plate 49.

As will be evident upon a detailed consideration of the electrical circuit of FIGURE 12, the momentary depressing of change switch 28 completes an energizing circuit for motor 40 which causes this motor to normally run through one complete cycle of operation, provided switch 30 is in the operate position. As a result of operation of the motor, arm 41 rotates in a clockwise direction and causes control bar 49 and plate 48 to move to the right, as seen in FIGURE 5. This movement to the right continues until the photographic slide 19 has been returned to the slide tray 23. When this occurs, member 21 which supports magnet 36 engages and is stopped against the inner surface of wall 16. Furthermore, an extension 55 of arm 54 engages a stationary pin 56 (see FIGURE 4), and as a result lever 54 rotates in a clockwise direction to release pin 51 and allow rod 49 to continue movement to the right, plate 49 being locked in position by a pivoted member 57.

In FIGURE 4, member 57 is shown in its normal position wherein it is maintained by a biasing spring. As bar 49 moves to the right, a cam member 58, carried by bar 49, engages the right hand end of member 57 and causes this member to rotate in a counter-clockwise direction against the force of its bias spring. This action takes places at the same time as pin 51 is released and the left-hand end of member 57 is effective to hook or lock plate 49.

As will be explained, the additional movement or overtravel of bar 49 after plate 48 has been locked in position is effective to actuate the slide tray advancing mechanism. After the slide tray has moved to bring the next succeeding slide into alignment with the slide receiving window 17, the motor continues its operation from the position shown in FIGURE 5 to cause rotation of arm 41 in a counter-clockwise direction, whereupon the overtravel between members 48 and 49 is taken up and plate 48 is unlocked as cam 58 moves to the left to allow member 57 to rotate in a counter-clockwise direction about its centrally located pivot. The bar 49, now carrying plate 48 again locked in position on the end thereof, continues its movement to the left until the second slide is positioned at the projection compartment 18 of the projector.

In this manner, the operator of the projector may selectively control push-button 28 to run through the sequence of slides in the slide storage tray 23, and this may be accomplished from a remote position, as will be apparent from a discussion of FIGURE 12.

Also, the slide changing mechanism may be connected to control a shutter, not shown. This shutter is effective to prevent a flooding of the screen with bright light as a slide is being returned to the slide storage tray.

Referring now to the slide tray advancing mechanism, reference numeral 59, FIGURE 4, identifies a pivoted lever of the slide tray advancing mechanism which at its upper end is provided with an angle portion 60 against which the upper end of arm 41 pushes to actuate the slide tray advancing mechanism. The lower end 61 of lever 59 is provided with a further angle portion which engages a notch in a pivoted plate 62. Engagement of portion 61 in the notch of plate 62 serves to lock the slide tray advancing mechanism, as will be apparent.

Lever 59 is pivoted at pivot 63 and this pivot 63 also carries a second L-shaped arm 64. The main extension of arm 64 is connected to arm 41 by means of a resilient wire 105 having a spring coil at each end thereof. The other portion of arm 64 is connected by means of a link 65 to plate 62. The drive connection between members 64 and 62 is by virtue of a pin 66 carried by the lower end of link 65. Pin 66 mates with an arcuate slot 67 formed in plate 62. Link 65 is biased by means of a spring 68 and the biasing force of this spring is adapted to be overcome by an electrically energizable solenoid 69 which can be called the reversing solenoid and whose energization is controlled by switch 31, the solenoid being energized when the switch is placed in the "rev" position. Energization of solenoid 69 causes link 65 to move to the right such that pin 66 engages the right-hand end of the arcuate slot 67.

The reference numeral 70 of FIGURE 4 identifies a biasing spring which is effective to bias lever 59 for counter-clockwise rotation about its pivot 63. Upon energization of motor 40 to cause movement of arm 41 to the right, as above described, the upper portion of this arm 41 engages surface 60 of lever 59 and causes lever 59 to move in a counter-clockwise direction about its pivot 63.

During the first portion of this rotation, the end 61 of lever 59 is lifted out of the notch provided in plate 62, thus freeing this plate for subsequent rotation. As lever 59 continues to rotate, lever 59 engages a cam surface 71 formed on the L-shaped arm 64, the engagement between these two members being shown in FIGURE 5. Plate 62 is connected by means of a pin 72, concealed in FIGURE 4, to a slide rod 73, which is shown more clearly in FIGURES 7 and 8. In FIGURES 4 and 5 the slide member 73 is partially visible but the overall configuration is concealed.

Referring now to FIGURES 7 and 8, slide member 73 can be seen to be mounted on the body of the projector in a movable fashion by means of an elongated slot 74 engaging a stationary pin 75, the length of slot 74 determining the extent of movement which can be achieved by pin 72. Slide member 63 also pivotally carries a pair of slide tray driving pawls 76 and 77, these driving pawls being pivoted at pivots 78 and 79, on the underside of slide 73 as seen in FIGURES 7 and 8. The driving pawls 76 and 77 are oppositely disposed, that is the driving portions 80 and 81 thereof extend into the gear rack 82 formed in portion 39 of the slide tray 23 so as to drive the slide tray in opposite directions. As shown in FIGURE 7, with the portions 80 and 81 both engaging the gear rack 82, the slide tray is locked against movement in either direction.

Reference numerals 83 and 84 designate a pair of stationary stop members which are mounted on the main housing of the projector below slide 73 and driving pawls 76 and 77, as seen in FIGURES 7 and 8. These stop members function to lift one or the other of the driving pawls 76 and 77 out of engagement with rack 82 upon movement of slide 73 so that the other driving pawl is effective to move slide tray 23 due to its engagement with gear rack 82.

Reference numerals 85 and 86 designate springs which are connected to slide 73 and to the driving pawls to bias the driving pawls 76 and 77 respectively into engagement with gear rack 82.

Referring again to FIGURE 5, this figure shows the apparatus in the condition wherein arm 41 has rotated to its maximum counter-clockwise or right-hand position and as a result plate 62 has rotated, in this case in a counter-clockwise direction. The corresponding position of the elements of the slide tray advancing mechanism are shown in FIGURE 8 in which plate 62 is rotated in a counter-clockwise direction and as a result slide 73 has been moved to a downward direction. This movement in a downward direction has caused driving pawl 77 to be lifted out of engagement with gear rack 82 due to the functioning of its stop 84. Driving pawl 76 has remained in engagement with gear rack 82 and as a result the slide tray has been advanced. It will be remembered that FIGURES 7 and 8 are bottom views of the projector as disclosed in FIGURES 1, 2 and 3 and therefore the slide tray has moved in a forward direction, that is it has moved toward the objective lens 11. Had switch 31 been placed in the "rev" position, then solenoid 69 would be energized and link 65 would swing to the right to engage the right-hand end of arcuate slot 67, as shown in FIGURE 6. FIGURE 6 shows plate 62 in the position it assumes with solenoid 69 energized and with the remaining portion of the projector shown in the position of FIGURE 5, that is with arm 41 at its maximum right-hand position. In this case, link 65 is effective to rotate plate 62 in a clockwise direction about its pivot and therefore slide 73 is moved in an upward direction, rather than in a downward direction, as shown in FIGURE 8. The upper direction of slide 73 causes driving pawl 76 to be lifted out of engagement with gear rack 82 and as a result driving pawl 77 causes the slide tray to move in an upward direction, as shown in FIGURE 7. As a result, the slide tray is moved in a reverse direction, that is it is moved in a direction away from the objective lens 11 of FIGURE 1.

As has been pointed out, with the slide tray advancing mechanism as disposed in FIGURE 7, that is while a slide is positioned at projection compartment 18, the slide storage tray is locked by means of the oppositely disposed engagement of driving pawls 76 and 77. When motor 40 is energized to return the slide to the tray, arm 41 moves to the right from the position shown in FIGURE 4, and until the slide tray advancing mechanism is actuated to the position shown in FIGURE 8, the slide tray is locked by the driving pawls 76 and 77.

At this time the slide tray locking mechanism of FIGURES 9, 10 and 11 is effective to lock the slide tray and to maintain the tray locked until arm 41 returns to the position shown in FIGURE 4. As arm 41 begins its return to the left-hand position, lever 59 immediately rotates counter-clockwise as a result of spring 70. However, arm 64 remains in the clockwise position of FIGURE 5 (with the slide tray advancing mechanism disposed as shown in FIGURE 8) until arm 41, through the medium of resilient connection 105, exerts a force on arm 64 to cause it to rotate in a counter-clockwise direction and again reset the slide tray advancing mechanism to the position shown in FIGURES 4 and 7.

Referring now to the operation of the slide tray locking mechanism which is effective to lock the slide tray during the return movement of arm 41 from its right-hand position to its left-hand position, FIGURE 9 shows this mechanism in its unlocked condition. Reference numeral 85 designates a slide tray locking pawl which is provided with a pair of elongated slots 86 and 87 mating with stationary pins 88 and 89. The position of locking pawl 85 is controlled by a pivoted arm 90, pivoted at 91, and having an upper portion carrying a pin 91 which mates with an elongated slot 92 formed in a linkage 93 connected to the armature of a solenoid 94. A spring 95 is provided to cause pin 91 to normally engage the right-hand end of slot 92. In FIGURE 9 the driving pawls 76 and 77 can be seen and these pawls are in a condition such as shown in FIGURE 7 wherein they are oppositely disposed to engage gear rack 82 and thereby lock slide tray 23 against inadvertent movement.

Referring now to FIGURE 4, reference numeral 95 identifies an L-shaped arm having a portion 96 which is adapted to engage extension 60 of arm 59. The upper cam surface 97 of the L-shaped arm 95 is effective to control a switch designated generally by means of reference numeral 98. Member 95 is pivoted at 99 and is biased for clockwise rotation about this pivot by means of a spring 100. As shown in FIGURE 4, the clockwise rotation of L-shaped arm 95 is limited by engagement with an offset portion 101 of arm 90. As has been above described, energization of motor 40 is effective to cause arm 59 to rotate, and in so rotating L-shaped arm 95 is rotated in a counter-clockwise direction such that cam surface 97 is effective to actuate switch 98, thereby opening the normally-closed portion of this switch and closing the normally-open portion of this switch, as will be more completely described in connection with FIGURE 12.

It is sufficient at this time to say that the closing of the normally-open portion of this switch is effective to energize solenoid 94.

Energization of solenoid 94 is synchronized with movement of L-shaped member 64 and thereby it is synchronized with the slide tray advancing mechanism. The parts are so constructed and arranged that solenoid 94 is actually energized somewhat before the slide tray has completed its movement, and in effect solenoid 94 is energized when the movement has been one-half executed. Therefore, slide tray locking pawl 85 moves into the position shown in FIGURE 10 wherein the right-hand end of pawl 85 engages the face of one of the gear teeth of gear rack 82. As seen in FIGURE 10, the slide tray driving pawls 77 are disposed in the general position of FIGURE 8 wherein the slide tray is in the process of being advanced in a forward direction by means of engagement with driving pawl 76. Also, as seen in FIGURE 10, pin 91 carried by arm 90 now engages the left-hand end of slot 92 so that spring 95 is now exerting a force which tends to move the slide tray locking pawl 85 to the right, this movement being restricted at this time however by means of engagement with the face of one of the gear teeth.

As forward movement of the slide tray progresses, the device finally assumes the position as shown in FIGURE 11 wherein slide tray driving pawl 76 has continued movement of the slide tray and locking pawl 85 has entered the space between two adjacent teeth in gear rack 82, spring 95 being effective to advance pawl 85 to its extreme right-hand position to thereby lock the slide tray. From FIGURE 11 it can be seen that while driving pawls 76 and 77 are no longer in a position to lock the slide tray, locking pawl 85 is now in a position to lock the tray and inadvertent movement of the tray is prevented. This condition of operation continues until solenoid 94 is de-energized as will be explained.

Referring now to the circuit diagram of FIGURE 12, an overall explanation of the operation of the photographic slide projector will now be made, relating the electrical and mechanical components of the projector.

Reference numeral 110 of FIGURE 12 designates a connector which is adapted to be connected to a source of alternating voltage. When connector 110 is so connected, alternating voltage is applied across conductors 111 and 112.

The projector as shown in FIGURE 12 in its off position, with the slide changing mechanism in the position as shown in FIGURES 2 and 3. The closing of on-off switch 32 causes the fan motor 15 and the projector lamp 13 to be energized in parallel, as can be seen in FIGURE 12. If the change switch 28 is now depressed, an energizing circuit for the motor can be traced from conductor 112 through motor 40, switch 30 in the operate position, conductors 113 and 114, and change switch 28 to conductor 111. As a result of this energizing circuit for motor 40, the motor begins movement of the slide changing mechanism. Referring to FIGURE 4, energization of motor 40 causes arm 41 to rotate in a clockwise direction and thereby moves bar 49 to the right. The first portion of the movement of arm 41 moves switch 115 to a closed position. As can be seen in FIGURE 12, switch 115 shunts change switch 28 and completes a holding energizing circuit for motor 40 such that the change switch 28 can now be released. Also, as seen in FIGURE 4, the initial movement of bar 48 to the right causes a cam surface 116 to move sufficiently far to the right to close a switch 117. As seen in FIGURE 12, this switch 117 is in series with solenoid 94.

As has been described, energization of motor 40 first causes the slide change mechanism to move a slide from the projection compartment, such as shown in FIGURE 3, to the slide tray 23. When this movement has been completed, member 57 is effective to lock plate 48, as shown in FIGURE 5, and bar 49 continues movement to the position shown in FIGURE 5. After the slide has been returned to the slide tray, and during this over-travel or continued movement of bar 49, L-shaped arm 95 is effective, by means of its cam surface 97, to actuate switch 98 from a first to a second position. The first position of this switch is shown in FIGURE 4 and in this position movable switch blade 118 engages stationary contact 119. The second position of this switch is shown in FIGURE 5 wherein movable switch blade 118 engages stationary contact 120. As seen in FIGURE 12, the closing of switch 118—120 at this time energizes solenoid 94. This energizing circuit can be traced from conductor 112 through switch 117, solenoid 94, switch 118—120, conductor 121, switch 30 in the operate position, conductor 113, and switch 115 to conductor 111.

Energization of solenoid 94 causes the slide tray locking pawl 85 to be operated as disclosed in FIGURES 10 and 11, above described. FIGURE 9 shows the apparatus with solenoid 94 deenergized. FIGURE 10 shows the condition of operation upon the initial energization of solenoid 94 and in this position the slide tray advancing mechanism has advanced the slide tray a portion of one step of movement and therefore the locking pawl 85 engages a tooth of the gear rack incorporated in the slide tray. Upon further movement of the slide tray by means of the slide tray advancing mechanism, the apparatus assumes the condition shown in FIGURE 11 wherein the energization of solenoid 94 causes the locking pawl 85 to drop into the space between two adjacent teeth of the gear rack and thereby lock the slide tray.

Since switch 30 is in the operate position, motor 40 continues to run and arm 41 now moves back to the left in a counter-clockwise direction from the position shown in FIGURE 5. While this movement of arm 41 allows a lever 59 to return to its position as shown in FIGURE 4, the L-shaped arm 95 cannot return to its original position since it is held in a position to maintain switch 118— 120 closed by virtue of engagement of the surface 101 of arm 90 with the L-shaped arm 95. In this manner, solenoid 94 is maintained in an energized position and the slide tray is locked as a slide is moved from the slide tray to the projection compartment within the projector. However, as the slide is moved completely out of the slide tray and approaches its ultimate position within the projector, cam 116 carried by bar 95 actuates switch 117 to again open this switch and thereby deenergize solenoid 94. This allows switch 118—119 to open and causes spring 100 to return the L-shaped arm 95 and the locking pawl 85 to their original positions of FIGURES 4 and 9 respectively.

If it is desired to remove the slide tray from the projector, switch 30 is placed in the load position and this completes an energizing circuit for motor 40 which can be traced from conductor 112 through motor 40, conductor 121, switch 118—119, conductors 122, 123, 124, 114, and 113 to switch 30 in the load position, and conductor 125 to conductor 111.

This energization of motor 40 causes the slide changing mechanism to move in much the same manner as above described. The main difference is that once the slide has been returned to the slide tray and switch 118—119 has been opened, the motor is immediately deenergized and stops in this position. The slide tray may then be removed from the projector, with all of the slides in position in their respective compartments.

When the switch is returned to the operate position, motor 40 is again energized by means of a circuit which can be traced from conductor 112 through motor 40, switch 30 in the operate position, conductor 113 and switch 115 to conductor 111. This circuit returns the apparatus to the position as shown in FIGURES 3 and 4 and motor 40 is denergized when switch 115 opens.

If it is desired to reverse the direction of movement of the slide tray, switch 31 is moved to the reverse position. In this position, and with switch 30 in the operate position, solenoid 69 is energized in parallel with motor 40. The function of solenoid 69 when energized, is to rotate link 65 (see FIGURE 6) and thereby control the direction of rotation of plate 62 to control the direction of movement of slide 73 and thereby the direction of movement of slide tray 23.

Switch 33 controls the focusing of the projector and as seen in FIGURE 12, the movement of switch 33 to one of its two positions causes energization of focusing motor 43 to cause this motor to run in one direction or the other, the objective lens 11 (see FIGURE 2) is caused to either move to the right or to the left, depending upon the state of energization of motor 34.

Reference numeral 130 designates a remote control unit which contains a first switch 131 connected in parallel with change switch 28 and thereby functioning as a remote change switch. Reference numeral 132 designates a second switch contained in the remote control unit and this switch is connected in parallel with switch 31, thereby forming a remote means for controlling the direction of movement of the slide tray. Reference numeral 133 designates a momentray type double pole switch. This switch is connected in parallel with the components of switch 33 and switch 133 thereby forms a remote means of focusing the projector.

From the above description it can be seen that I have provided an improved photographic slide projector wherein electrically energizable means such as motors and solenoids are utilized to control the slide changing mechanism, the slide tray advancing mechanism, the slide tray locking mechanism, and the means controlling the direction of movement of the slide tray. Furthermore, my improved photographic slide projector combines these features with a magnetic changing device whereby a simple and compact automatic type slide projector is provided having reliable operation which is not susceptible to jamming or to damaging of the slides.

I claim as my invention:

1. In combination, a photographic slide tray having a plurality of compartments to hold a plurality of individual photographic slides, a gear rack formed on a surface of said slide tray, the pitch of the gear teeth being equal to the spacing of said compartments; a slide projector having a platform adapted to receive said slide tray and to support the same with one of the slides in alignment with a slide receiving window formed in a wall of said projector; slide changing mechanism, said slide changing mechanism being constructed and arranged to selectively move the slides one at a time from said slide tray through said window to a projection compartment and to then return the slides to the slide tray; a slide tray driving pawl adapted to engage said gear rack and move said slide tray, said driving pawl being effective upon a slide being returned to said slide tray to move said slide tray to bring a different slide into alignment with said window; a movable slide tray lock pawl adapted to engage and hold said gear rack, and means controlled by said slide changing mechanism to move said lock pawl toward said gear rack as said driving pawl moves said slide tray to cause said lock pawl to engage the face of one of the gear teeth and to subsequently enter the space between said one tooth and the succeeding tooth as said slide tray continues to move, said lock pawl then functioning to lock said slide tray after it has moved a distance equal to the spacing of the slides in said slide tray.

2. In combination, a photographic slide tray having a plurality of compartments to hold individual photographic slides, a gear rack formed on a surface of said slide tray, the pitch of the gear teeth of said gear rack being equal to the spacing of said compartments; a slide projector having a platform adapted to receive said slide tray and to support the same with one of the slides therein in alignment with a slide receiving window which formed in an adjacent wall of said projector; slide changing mechanism constructed and arranged to move said one slide through said window to a projection compartment within said projector and to then return said one slide to its compartment within said slide tray, a slide tray driving pawl controlled by said slide changing mechanism and effective upon said one slide being returned to its compartment to move said slide tray and to bring a succeeding slide into alignment with said window; a movable slide tray locking pawl adapted to enter the space between adjacent teeth of said gear rack to thereby hold said slide tray, an electrically energizable solenoid having a movable armature which is resiliently connected to said locking pawl, and means controlled by said slide changing mechanism to energize said solenoid to move said locking pawl toward said gear rack prior to the time that said driving pawl has completed movement of the slide tray to thereby cause said locking pawl to lead said gear rack and to resiliently engage the face of one of the gear teeth and to subsequently enter the space between said one gear tooth and the next succeeding tooth as said driving pawl compltes movement of said slide tray, said locking pawl thereby functioning to lock said slide tray after it has moved a distance equal to the spacing of the individual slides in the slide tray.

No references cited.